3,484,338
ADHESIVE COMPOSITION
Richard K. Britton, Topsfield, John P. Christopher, Beverly, John S. Vegella, Lynn, and William H. Neuss, Beverly, Mass., assignors to Borden, Inc., New York, N.Y., a corporation of New Jersey
No Drawing. Filed Jan. 21, 1965, Ser. No. 427,127
Int. Cl. B32b 15/20, 27/04, 23/04
U.S. Cl. 161—216      7 Claims

ABSTRACT OF THE DISCLOSURE

A water-based adhesive consisting of an emulsion of an interpolymer of a carboxylic acid group containing monomer and monomers copolymerizable therewith and a water-soluble thickener and the use of this adhesive in laminating metals, textiles, paper, wood and the like.

---

This invention relates to water-based adhesives suitable for bonding metals, cellulosic materials, fabrics, minerals, and the like.

Adhesives based upon casein in conjunction with natural or synthetic rubber latex, although in wide commercial use, suffer from several disadvantages. These include the tendency to foam during use, and reduction in viscosity of the adhesive with age. In addition the protein nature of the casein tends to leave a residual odor in the laminations and spoilage has been apparent after extended storage. Certain of the more efficient retardants cannot be used for preparing laminates for food-packaging applications because of toxicity considerations.

The present invention provides a water-based adhesive suitable for use as a laminating adhesive for bonding metals, textiles, paper, wood and the like to similar or other materials which overcomes the limitations of the casein-based adhesives heretofore used. The invention also provides an adhesive which has increased adhesion to metal surfaces, even metals having oily coatings on their surfaces thereby allowing for elimination of an expensive and time-consuming process for removal of oily materials prior to application of the adhesive composition. Foaming of the adhesive during use is reduced because of the smaller quantity of surfactant needed in the polymerization step. This is due to the self-emulsifying property of the particular monomers used. Also, we have found that the reduced surfactant content increases the water resistance of the adhesive. Reactivity of the present adhesive emulsion is increased over that of casein containing adhesives, thereby eliminating the need for prolonged heat curing.

Briefly stated, the present invention provides an adhesive comprising a synthetic latex emulsion of polymerized monomers, at least one of such monomers containing carboxylic groups, and a water-soluble thickener. A water-soluble fluoride salt may be included to advantage. In addition a cross-linking agent may be added to the adhesive composition when increased chemical resistance is necessary. Because addition of the cross-linking agent generally reduces the pot life of the adhesive, we have found that when it is required the cross-linking agent is best added to the adhesive combination just prior to use. The invention further provides a laminated structure, for example a paper-foil, wherein the respective laminae are adhered together by the adhesive hereinafter described.

The adhesive is made by preparing a water-based latex dispersion comprising polymerized carboxylic acid group containing monomers and adding to the dispersion an aqueous solution of water-soluble thickeners. Cross-linking agents may be added as required in order to extend the chemical resistance of the adhesive.

As to materials, the synthetic polymer used is a water-based dispersion of rubber or resin-type polymers in which a carboxylic group containing monomer or co-monomer is an essential component. Useful monomers of the class which must be part of the adhesive composition of this invention are those which contain a carboxylic acid structure (—COOH) as for example $C_3$–$C_8$ unsaturated mono- and polybasic carboxylic acids examples of which include acrylic, methacrylic, fumaric, maleic, crotonic, and itaconic and the like. The carboxylic acid group containing monomer may be used in proportion of up to 20% by weight and greater of the polymer in the polymerized dispersion. The said monomer may be used as a comonomer of interpolymers comprising two or more additional monomers. Examples of additional monomers which can be used to form interpolymers with the carboxylic acid monomer include vinyl monomers, i.e., a monomer in which a carbon to carbon double bond is present, which will copolymerize with said acid monomer. Examples of this class of monomer include butadiene, styrene, butadiene-styrene copolymers, acrylic and methacrylic acid esters of $C_1$–$C_8$ aliphatic alcohols, and copolymers of said esters with styrene, vinyl acetate, acrylonitrile, butadiene-acrylonitrile copolymers, and mixtures and copolymers of the named monomers and copolymers.

The preferred pH range of the latex dispersion is alkaline and is between about 8 and 11. The use of an acid latex however, is not precluded if said acid latex can tolerate addition of sufficient alkali to raise the pH of the latex to the range of between about 8 and 11. Conventional volatile alkaline materials such as ammonium hydroxide may be used to raise the pH.

The water-soluble thickener is generally a polymeric material which when added to an alkaline medium increases the viscosity of the medium. Generally the thickeners most useful are water-soluble, readily dispersable in the alkaline latex and do not interfere with the mechanical stability of the latex and the water- and heat-resistant properties of the adhesive. The thickener should have long range viscosity stability to promote commercial acceptance. It is preferably an acid group containing cross-linked acrylic emulsion copolymer. Examples of other suitable polymer thickeners include polyvinyl alcohol, polyacrylamides, and $C_2$–$C_4$ alkyl oxide polymers of such molecular weight that they retain their water solubility. In particular the preferred thickner is a highly carboxylated, cross-linked acrylic polymer. Examples include co- and inter-polymers of $C_3$–$C_8$ unsaturated mono- and polycarboxylic acid and unsaturated or polyhydric alcohols.

As to the fluoride salt, generally any fluoride salt of a volatile alkali compound from which fluoride ion is released in aqueous solution can be used to advantage in the present invention. The water-soluble fluoride salts include ammonium fluoride, ammonium silicofluoride, ammonium bi-fluoride, and the like.

The cross-linking ability of the carboxylic acid group containing polymer permits curing to take place when being dried. The greater reactivity of this composition also allows curing to take place at room temperature. Such adhesives have additional heat and chemical resistance and resistance to redispersion in water. The polymers are believed to cure through the carboxylic groups of the latex polymer; the result is a water-resistance adhesive bond. The use of cross-linking agents is especially desirable in the preparation of laminated aluminum foil wherein said foil is required for use under environmental conditions calling for additional resistance to chemical attack. For example, uncooked biscuit dough has been found to attack the adhesive bond of the foil laminate unless the bonding adhesive has been cross-linked. Since the curing agent reduces the pot life of the adhesive to a considerable extent, the cross-linking agent is preferably added just prior to use. When used, the cross-linking agents are members of the class that react with carboxylic group containing compounds. Generally the class consists of difunctional or polyfunctional materials, each functional unit being capable of reaction with carboxylic acid groups. Examples of cross-linking agents include epoxy resins capable of being emulsified, amine-carbamates, water-soluble polyamines, water-soluble melamine and urea formaldehyde resins, sodium aluminate, zinc oxide and magnesium hydroxide.

As to proportions, we prefer to use an aqueous latex emulsion of between about 30%–70% of the synthetic polymer or interpolymer measured on a solid basis by weight. The optimum concentration is between about 45%–55%. The polymerizable carboxylic acid group containing material is present in latex emulsion in the proportions of at least about .5% on a solid basis by weight of the emulsion polymer or interpolymer with preferred ranges for optimum properties between 2%–10%. Sufficient volatile alkali such as ammonium hydroxide is added to the latex emulsion after polymerization in such quantities as to result in a pH range of between about 8 and 11.

The thickener is added to the alkaline latex emulsion in proportion of up to about 15 parts by weight of thickener for 100 parts by weight of polymer emulsion. It is preferred that the thickener be added in proportion of between about 2–6 parts.

The water-soluble fluoride salt may be added in proportion of to about 2.5 parts by weight for 100 parts by weight of the polymer emulsion. The preferred range is between about .2–1.4 parts.

Water may be added as desired, however, we have generally found that up to 150 parts by weight for 100 parts by weight of said polymer emulsion results in a satisfactory adhesive. We generally use between about 5–40 parts.

When additional cross-linking agents are required, the quantity used varies in accordance with the particular use to which the adhesive is to be put. We have found that generally up to about 10 parts by weight of cross-linking material for 100 parts by weight of polymeric material solids in the latex emulsion may be used with the preferred range being 2–5 parts. The amount used being limited by the practical consideration of useful pot life after addition.

The following table offers as an illustration, a range of the components of the adhesive composition which results in a good adhesive composition. The table is by way of illustration and not to be considered a limitation upon this invention. The proportions given in the table are in parts by weight for 100 parts by weight of polymer emulsion.

TABLE I

| Components: | Range for 100 parts of polymer emulsion |
| --- | --- |
| Polymer emulsion (50% solids) | 100 |
| Thickener | 2–6 |
| Fluoride salt (optional) | .2–1.4 |
| Water | 5–40 |
| Cross-linking agent (optional) | About 4 |

The synthetic latex emulsion adhesive may be prepared from emulsion polymer systems available in commerce or polymerization may be accomplished by methods known in this art. A generalized procedure using styrene, butadiene and an acrylic acid is described as illustrative of a preparation for this type interpolymer. When other monomers are used, adjustment of the relative amounts may be required in accordance with principles known to those skilled in this art.

TABLE II.—TYPICAL STYRENE-BUTADIENE AND ACRYLIC ACID INTERPOLYMER

| Components: | Parts by weight |
| --- | --- |
| Styrene | 55–65 |
| Butadiene | 42–32 |
| Polymerizable acid (acrylic acid or methacrylic acid) | .5–5 |
| Alkyl-aryl sulfonate (100% active) | 3.5 |
| Water | 95–85 |
| Buffer (sodium bicarbonate) | .5 |
| Sequesterant (tetrasodium salt of ethylenediamine tetracetic acid) | .1 |
| Catalyst (potassium or ammonium persulfate) | .2 |
| Chain transfer agent (dodecyl mercaptan) | .2 |

If acrylic acid is used consideration must be given to its high water solubility and high reactivity. If all the acrylic acid is added initially, a large amount of homopolymer would be formed in the water phase. In order to favor the copolymerization route, it is necessary to reduce a small fraction the amount of the acid entering the polymer chain. To achieve this, the high water solubility and reactivity of acrylic acid can be compensated for by addition of the acid in increments over the course of the polymerization cycle. Since methacrylic acid is less water soluble than the acrylic acid, its reactivity in the water phase is less critical. With polymerization skill, both materials may be successfully used to introduce reactive acid groups into the polymer chain.

The reaction time and particle size can be controlled through proper selecton of emulsifier level, agitation and temperature schedules. Polymer molecular weight (Mooney viscosity) can be adjusted by the degree of conversion and the level of chain transfer agent. At the completion of the polymerization period, the latex can be de-volatilized to remove unreacted monomers. This can be followed by neutralization of the acid groups with a volatile base such as ammonia and the addition of a suitable antioxidant.

A carboxylated acrylic interpolymer may be used as a base for the adhesive of this invention. This type interpolymer can be made by the following procedure:

TABLE III

| Components: | Parts by weight |
| --- | --- |
| Ethyl acrylate | 35–50 |
| Methyl methacrylate | 2–7 |
| Itaconic acid | .2–3 |
| Ammonium persulfate (about) | .1 |
| Sodium carbonate (about) | .1 |
| Nonyl phenoxy poly (ethyleneoxy) ethanol | 1.5–2.5 |
| Water | 45–60 |

Into a flask equipped with a reflux condenser, a dropping funnel, a nitrogen purge, and an agitator is added water, sodium carbonate, and ammonium persulfate. The mixture is agitated slowly until solution is achieved. The solution is heated to approximately 30° C. The monomers are mixed in the dropping funnel. Under moderate agitation 10% of the monomer charge is added to the flask. A slow nitrogen purge is started and maintained throughout the reaction cycle. Heat is gradually applied to the mixture up to 70° C. The remaining monomers are then slowly added to the flask over a three-hour period maintaining the temperature of reaction between 70° C. and 75° C. When the addition is completed, temperature is maintained at 75° C. to 80° C. for about one hour. The mass is then cooled to room temperature and if necessary the pH is adjusted to about 4–6 with ammonium hydroxide.

In the following examples, which illustrate the invention, the proportions expressed are in parts by weight.

Example I (a) A water-based adhesive composition is prepared as follows: To 75 parts of 50% aqueous dispersion of carboxylated (acrylic acid) styrene-butadiene interpolymer (ratio acid to styrene and butadiene 4 to 97) is added a mixture of .6 part of ammonium hydroxide (28%) and 3 parts of cross-linked polyacrylic acid in 20 parts of water. The pH is about 9.

(b) A water-based adhesive composition is prepared as in Example I(a) except that .6 part of ammonium bifluoride is added to the mixture before addition to the aqueous dispersion.

(c) A water-based adhesive composition is prepared as in Example I(a) except that the carboxylated styrene-butadiene interpolymer aqueous dispersion is replaced by 75 parts of a 46% aqueous dispersion of an acrylic interpolymer (ratio acrylate ester to acid 98 to 2) and the proportion of polyacrylic acid is reduced to 1.5 parts. The pH is about 8–8.5.

Example II

Cross-linked water-based adhesive compositions are prepared as in Examples I(a), (b) and (c) and to 98 parts of the respective compositions, are added separately and in turn: 2 parts of oil-soluble epoxy resin, 2 parts of dispersable ure-formaldehyde resin, and 2 parts of dispersable melamine-formaldehyde resin. The solids content of the last two mentioned cross-linking agents is varied between 60% and 80%. The pot life of the cross-linked compositions was about 24 hours.

Example III

Water-based adhesive compositions are prepared as in Examples I and II except that the carboxylated interpolymers therein used are replaced separately and in turn by the interpolymers of the carboxylated monomers and vinyl monomers, and in proportion described herein.

Example IV

Water-based adhesive compositions are prepared as in Examples I and II except that the cross-linked polyacrylic acid thickness therein used is replaced separately and in turn by the other thickeners, and in proportion, described herein.

Various tests are performed on the adhesive compositions as prepared including the following:

(a) Viscosity stability tests were run over a period of time up to one year in duration and compared with casein based adhesives. The water-based adhesive compositions of this invention increased moderately in viscosity over the one year period, whereas the viscosity of a casein based adhesive composition was substantially reduced to a level where its fluidity prevented satisfactory machine application of this adhesive. (b) Foam resistance tests were conducted in high speed mixers. The volume after mixing was compared to the volume before mixing. In one typical run the composition of Example I(b) had an initial volume of 330 cubic centimeters (cc.) and after 30 seconds of high speed mixing the volume was 370 cc. By way of comparison a casein based adhesive increased in volume from 300 cc. to in excess of 400 cc. after mixing.

The adhesive composition may be applied in the usual manner to foil against which there may then be applied a sheet of paper. The composite pair are rolled into contact and permitted to dry. Application of heat accelerates the drying time. The following table demonstrates the effectiveness of the adhesive composition in combination with a fluoride salt and a cross-linking agent under different environmental conditions.

TABLE IV.—ALUMINUM FOIL TO WET STRENGTH KRAFT PAPER
[Percent fiber failure measured]

| | Dry adhesion | 16-hour water soaking [1] | 16-hour uncooked biscuit dough exposure [2] |
|---|---|---|---|
| Adhesive | 100 | 50 | |
| Adhesive and fluoride | 100 | 100 | 0 |
| Adhesive and cross-linking agent | 100 | 100 | |
| Adhesive, fluoride and cross-linking agent | 100 | 100 | 100 |

[1] Aluminum foils laminated with wet strength Kraft papers (bonded with the adhesives shown) were soaked in water at room-temperature for 16 hours. The foil and paper were then separated. The failure location was observed (either at the adhesive bond or in the paper fibers). The same test was performed for "Dry Adhesion" except that the foil was not soaked in water.

[2] Aluminum foils laminated with wet strength Kraft papers (bonded with the adhesives shown) were placed in intimate contact with uncooked biscuit dough at room-temperature for 16 hours. The foil and paper were then separated. The failure location was observed.

When the parts by weight of the polymer emulsion of the interpolymer in the adhesive used was less than 45, noticeable reductions in the adhesive bond strength in the laminate became apparent. In typical examples, where the polymer emulsion level was reduced to 65 and 45 respectively, the "16-Hour Water Soaking" test showed that the percent fiber failure decreased to 75% and 20%. In corresponding "Dry Adhesive" tests the percent fiber failure was 100% and 90%, respectively.

It will be understood that it is intended to cover all changes and modifications of the examples of the invention herein chosen for the purpose of illustration which do not constitute departures from the spirit and scope of the invention.

We claim:

1. A water-based adhesive composition consisting essentially of a synthetic latex emulsion, a water-soluble thickener in the proportion of about 2 to about 15 parts by weight of said thickener for each 100 parts by weight of emulsion, and (1) a fluoride salt of a volatile alkali compound, and (2) a volatile alkaline material, said emulsion comprising an interpolymer of a carboxylic acid group containing monomer and monomers copolymerizable therewith.

2. A water-based adhesive composition consisting essentially of a synthetic latex emulsion consisting essentially of an interpolymer of a carboxylic acid group containing monomer selected from the class consisting of (a) acrylic, (b) methacrylic, (c) fumaric, (d) maleic (e) crotonic and (f) itaconic acid, and vinyl monomers copolymerizable therewith, said vinyl monomers selected from the clas consisting of (a) butadient, (b) styrene, (c) butadiene-styrene copolymers, (d) acrylic and methacrylic acid esters of $C_1$–$C_8$ aliphatic alcohols and (e) copolymers of said esters with styrene, vinyl acetate, acrylonitrile, butadiene-acrylonitrile copolymers and mixtures and copolymers of said monomers and copolymers, said carboxylic acid group containing monomer being present in proportion, by weight, of between about 2–10 parts for 100 parts of said vinyl monomers and said interpolymer being an aqueous emulsion of concentration between about 45%–55%, a carboxylated water-soluble polymeric thickener selected from the class consisting of (a) polymers of $C_3$–$C_8$ unsaturated mono- and polycarboxylic acids and saturated and polyhydric alcohols, (b) polyvinyl alcohol, (c) polyacrylamides and (d) $C_2$–$C_4$ alkyl oxide polymers in proportion, by weight, of about 2–6 parts of said thickener for 100 parts of said emulsion, and (1) a fluoride salt of a volatile alkali salt selected from the class consisting of (a) ammonium fluoride, (b) ammonium silico fluoride and (c) ammonium bi-fluoride in proportion, by weight, of between about .2–1.4 parts of said salt for 100 parts of said emulsion, and (2) a volatile alkaline material present in proportion sufficient to raise the pH of said adhesive composition to between about 8 and 11.

3. A water-based adhesive consisting essentially of a synthetic latex emulsion consisting essentially of an interpolymer of a carboxylic acid group containing monomer and vinyl monomers copolymerizable therewith in proportion, by weight, of at least about ½ part of said carboxylic acid group containing monomer for 100 parts of said vinyl monomers, a water-soluble thickener consisting of a carboxylated water-soluble polymer in proportion of up to 15 parts of said thickener for 100 parts of said emulsion, and (1) a fluoride salt of a volatile alkali compound capable of releasing fluoride ion in aqueous solution, said fluoride compound being present in proportion by weight of up to about 2.5 parts for 100 parts of said emulsion, and (2) a volatile alkaline material present in proportion sufficient to raise the pH of said adhesive composition to between about 8 and 11, said interpolymer being an aqueous emulsion of concentration between about 30%–70%.

4. A laminated structure comprising at least two laminae and a water-based adhesive interposed between the respective laminae and causing said laminae to adhere together, said adhesive being the composition of claim 3.

5. A foil-cellulosic structure comprising a metallic foil member and a cellulosic sheet member with an adhesive interposed therebetween which is strongly adhesive to both foil and sheet, said adhesive being the water-based adhesive composition of claim 3.

6. A foil-cellulosic structure comprising a metallic foil member and a cellulosic sheet member with an adhesive interposed between, which is strongly adhesive to both foil and sheet, said adhesive consisting essentially of a synthetic latex emulsion consisting essentially of an interpolymer of a carboxylic acid group containing monomer and vinyl monomers copolymerizable therewith in proportion, by weight, of at least about ½ part of said carboxylic acid group containing monomer for 100 parts of said vinyl monomers, a water-soluble thickener consisting of a carboxylated water-soluble polymer in proportion of up to 15 parts of thickener for 100 parts of said emulsion, a multi-functional cross-linking agent for said carboxylic acid group containing monomer, each functional unit of said agent being capable of reaction with carboxylic acid groups and said agent being present in proportion, by weight, of up to about 10 parts for 100 parts of said emulsion, and a volatile alkaline material present in proportion sufficient to raise the pH of said adhesive to between about 8 and 11, said interpolymer being an aqueous emulsion of concentration between about 30%–70%.

7. The structure of claim 6, wherein said foil is aluminum foil and said cellulosic sheet is paper.

References Cited
UNITED STATES PATENTS 2,784,128   3/1957   Schroeder.

MURRAY TILLMAN, Primary Examiner

H. ROBERTS, Assistant Examiner

U.S. Cl. X.R.

117—132, 138.8, 145, 148, 155, 161; 161—217, 218, 251; 260—29.6, 29.7, 80.5, 80.7, 836, 851